United States Patent [19]

Sampatacos

[11] Patent Number: 4,541,777
[45] Date of Patent: Sep. 17, 1985

[54] LOW DRAG, BEARINGLESS ROTOR HEAD FOR HELICOPTERS

[75] Inventor: Evan P. Sampatacos, Cypress, Calif.

[73] Assignee: Hughes Helicopters, Inc., Culver City, Calif.

[21] Appl. No.: 358,248

[22] Filed: Mar. 15, 1982

[51] Int. Cl.[4] ............................................. B64C 27/38
[52] U.S. Cl. ..................................... 416/138; 416/141
[58] Field of Search ............... 416/134 A, 138 A, 141, 416/131 A, 135 B, 140 A

[56] References Cited

U.S. PATENT DOCUMENTS

| | | | |
|---|---|---|---|
| 2,949,967 | 8/1960 | Jovanovich | 416/138 A X |
| 3,669,566 | 6/1972 | Bourquardez et al. | 416/138 A X |
| 3,865,511 | 2/1975 | Breuner | 416/135 B X |
| 3,879,153 | 4/1975 | Breuner | 416/141 |
| 3,880,551 | 4/1975 | Kisovec | 416/138 A X |
| 3,926,536 | 12/1975 | Ciastula et al. | 416/135 B |
| 4,182,597 | 1/1980 | Derschmidt | 416/134 A |

FOREIGN PATENT DOCUMENTS 2926935 1/1981 Fed. Rep. of Germany ... 416/134 A

Primary Examiner—Everette A. Powell, Jr.
Attorney, Agent, or Firm—Beehler, Pavitt, Siegemund, Jagger & Martella

[57] ABSTRACT

A low drag, bearingless coupling is provided between a blade and hub of a helicopter rotor system by coupling the hub and blade together by means of a planar, elastic flexure or element which extends between the blade and the hub in a generally azimuthal direction in the rotor plane. The thickness of the flexure is such so that it is smaller than the adjacent blade or hub thicknesses so that the aerodynamic cross section presented by the flexure to air flow is negligible. The flexure is particularly characterized by having a bend in the coupling between the hub and blade. In the illustrated embodiment the flexure is integral and "W"-shaped with a "U"-shaped segment of the "W"-shaped flexure extending between each side of the adjacent blade and hub arms. The flexure may be made of rod having a circular cross section or of flat plate formed in a shape to have the desired elastic and resilient characteristics.

17 Claims, 14 Drawing Figures

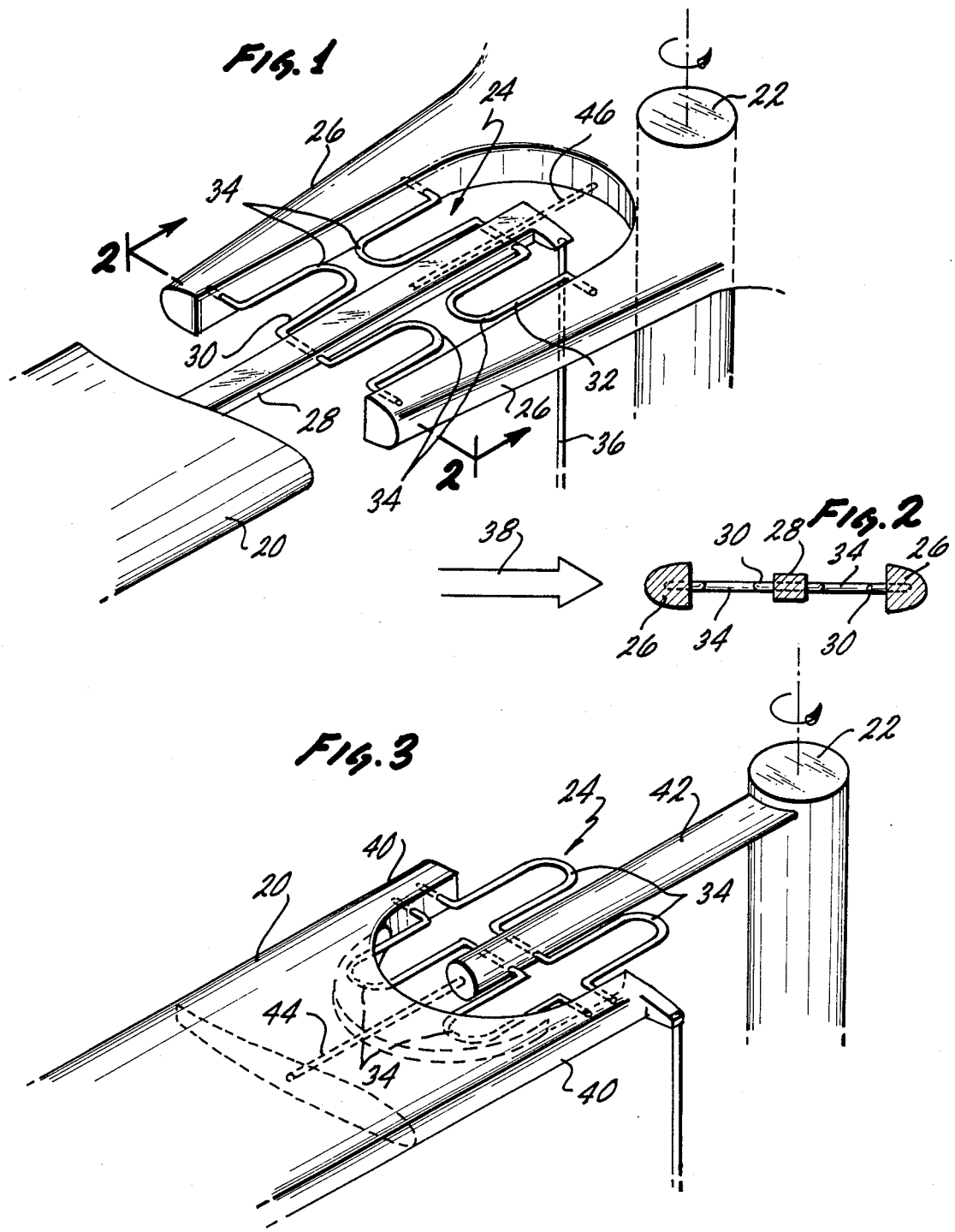

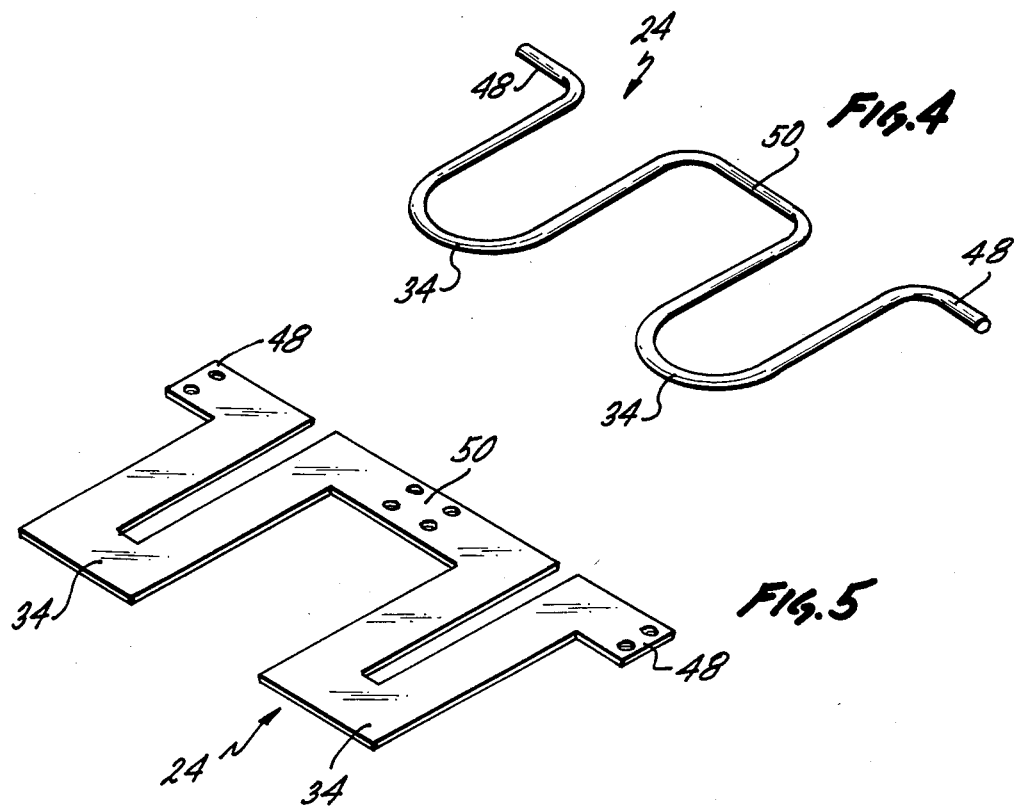
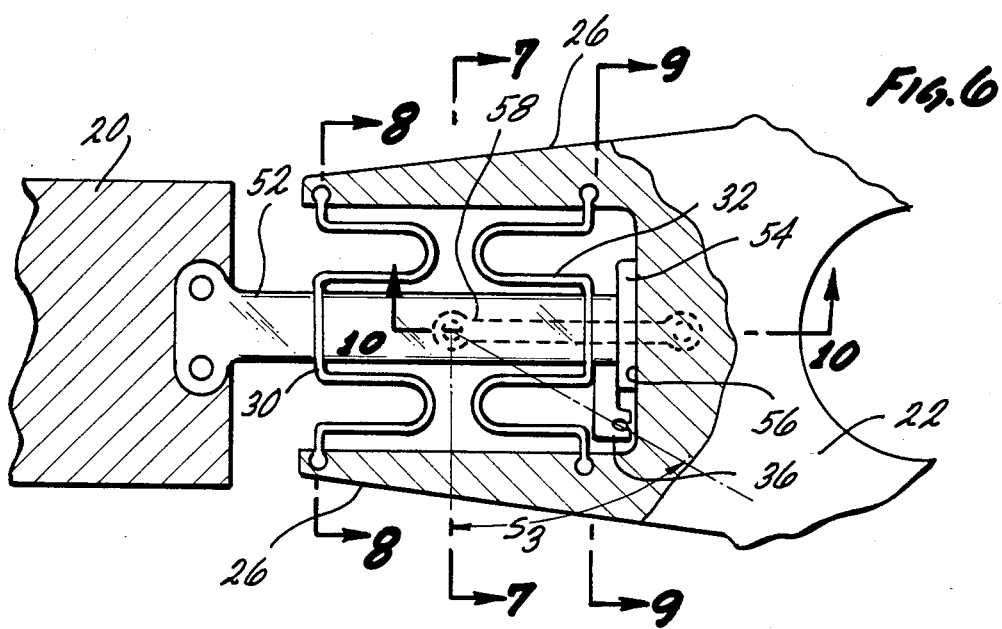

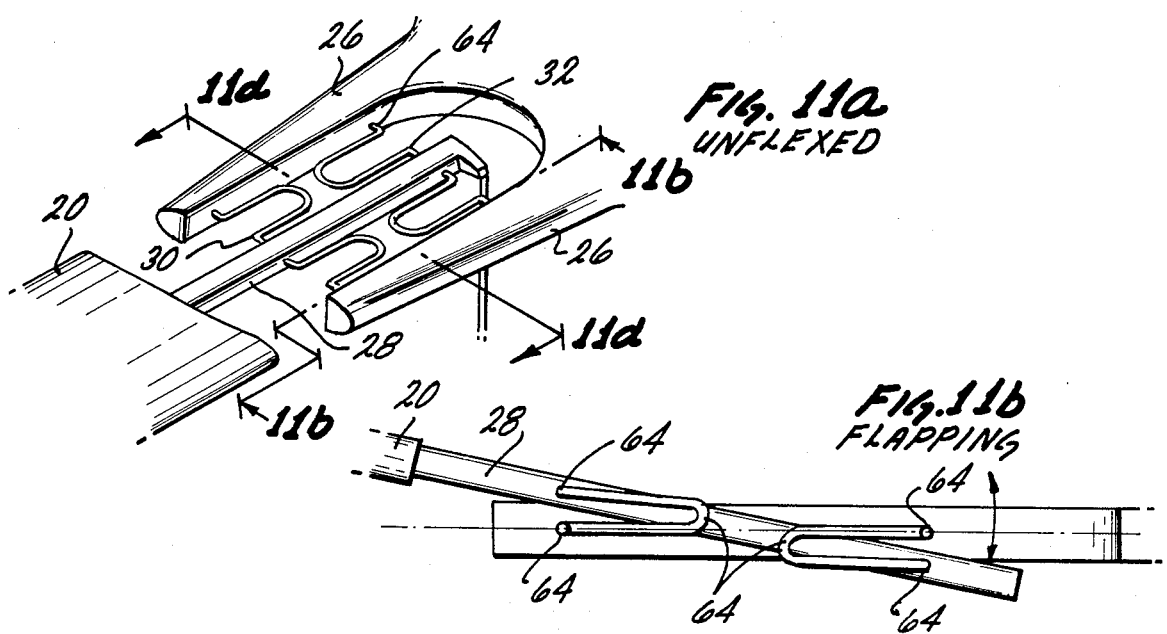
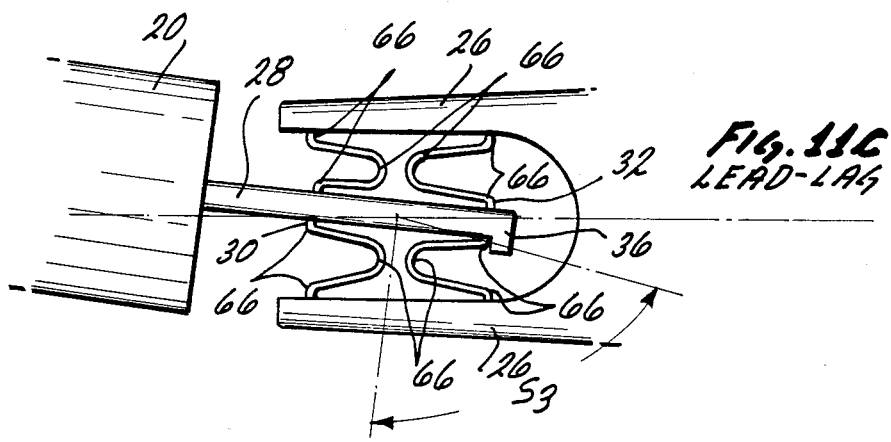
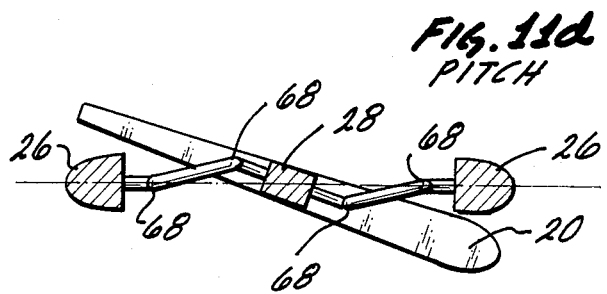

LOW DRAG, BEARINGLESS ROTOR HEAD FOR HELICOPTERS

BACKGROUND OF THE INVENTION

1. Field of the Invention

The present invention relates to the field of bearingless couplings between the blade and rotor hub in a helicopter, and in particular relates to the flexures in such bearingless couplings.

2. Description of the Prior Art

Bearingless couplings between helicopter blades and rotor hub are well known to the art and numerous versions have been designed and used in an attempt to provide a rugged and flexible coupling between the blade and hub.

Derschmidt et al., "Rotor Without Flapping Hinges and Without Lead-Lag Hinges", U.S. Pat. No. 4,201,515 shows a blade-to-hub coupling based upon a plurality of coupling arms formed within a generally cylindrical envelope by exploitation of a multiple rod design. Ditlinger, "Flexible Coupling", U.S. Pat. No. 3,893,788 also shows a multiple rod design for connecting a helicopter blade to a hub wherein the rods are disposed in a generally cylindrical pattern.

Blade-to-hub couplings having a small cross section to the direction of rotation of the rotor system are also well known. For example, Ormiston et al., "Hingeless Helicopter Rotor with Improved Stability", U.S. Pat. No. 3,999,886 uses a radially extending arm from the hub to provide flexure about the radial axis in the rotor plane as well as for lead-lag deflections and out-of-plane flapping. A similar flexure is described by Roman et al., "Composite Hingeless Rotor Hub for Rotary Wing Aircraft", U.S. Pat. No. 4,111,605 where flat straight straps, generally extending in the radial direction, are paired and used for blade flexure in much the same way as the hingeless coupling of Ormiston. A similar composite flexure is described by Bourquardez et al., "Rotor Construction", U.S. Pat. No. 3,669,566.

Many other designs for using a flex beam coupling between blade and blade and blade and hub are known to the art. Each of these designs are particularly characterized by using elastomeric or fiber composites in complex coupling structures which have reasonably large size and bulk in directions normal to the rotor plane. Examples of such flex beam couplings are shown by Derschmidt, "Helicopter Rotor Head", U.S. Pat. No. 4,182,597; Kisovec, "Rotary Head Assembly for Rotary Wing Aircraft", U.S. Pat. No. 3,880,551; Gorndt et al., "Rotor Blade Retention System", U.S. Pat. No. 3,862,812; Rybicki, "Cross Beam Rotor", U.S. Pat. No. 4,093,400; and Baskin, "Rotary Head Assembly for Rotary Wing Aircraft", U.S. Pat. No. 3,874,815.

What is needed is a bearingless coupling which is rugged, simple in design, inexpensive to manufacture, and which provides a minimum of drag to the rotary motion of the blade and hub system, but which at the same time provides for controlled flexure of lead-lag angles, flapping, and pitch of the blades. These and other objects of the present invention are achieved by the invention as briefly described below.

BRIEF SUMMARY OF THE INVENTION

The present invention is an improvement in a helicopter hub-to-blade, bearingless coupling used between a blade and hub. The blades define a rotor plane. The improvement comprises a planar, elastic flexure for coupling the blade to the hub. The planar flexure is disposed in a plane generally parallel to the rotor plane. The flexure also extends between the blade and hub in a generally azimuthal direction in the rotor plane. By means of this combination, a rugged, inexpensive, low-drag and bearingless coupling is provided between the blade and hub.

In one embodiment the improvement comprises a rotary hub having a plurality of radially extending and generally planar hub arms. A blade, having a blade shank, is proximately disposed to the hub arms. A planar, elastic means for coupling the blade shank to the hub arms is provided in such a manner that the elastic means is disposed between a pair of the hub arms and generally lies in a plane of flexure which is parallel to the plane defined by the hub arms.

In another embodiment, the improvement comprises a rotary hub having a plurality of radially extending hub arms and a blade having a pair of blade shank arms proximate to one of the hub arms. A planar elastic means for coupling the blade shank arms to the hub arm is provided in such a manner that the elastic means is disposed between the pair of blade shank arms and the hub arm and generally lies in a plane of flexure parallel to the plane defined by the blade shank arms.

More specifically, the improvement includes a planar elastic flexure which has at least a pair of elastic elements disposed between the blade and hub. Each element extends in a generally azimuthal direction in the rotor plane with each element having at least one flexing bend formed therein. The bend in each element is U-shaped, the extended ends of which are coupled between the blade and hub. The axis of symmetry of the U-shaped bend lies in a generally radial direction and in the rotor plane. In the illustrated embodiment, the elastic element is actually an integral W-shaped element, the extended ends of which are either coupled between opposing shank arms of the blade in one embodiment or opposing hub arms of the hub in another embodiment. In the first case, the center of the W-shaped element is coupled to the hub, while in the second case the center of the W-shaped element is coupled to a blade shank. In either case, the axis of symmetry of the W-shaped element lies in a generally radial direction and in the rotor plane.

These and further embodiments of the present invention are best understood by viewing the following Figures in light of the detailed description.

BRIEF DESCRIPTION OF THE DRAWINGS

FIG. 1 is a top perspective view showing a cutaway portion of one embodiment of the flexure which couples a blade and helicopter hub.

FIG. 2 is a cross section taken through the embodiment of FIG. 1 through section 2—2.

FIG. 3 is a top perspective view of another embodiment showing the flexure between a helicopter blade and hub.

FIG. 4 is a perspective view of one embodiment of the W-shaped flexure made from rod.

FIG. 5 is an alternative embodiment of the flexure of the type shown in FIG. 4 wherein the flexure is made from sheet or plate.

FIG. 6 is a top plan view of a third embodiment wherein the flexure is coupled to a pitch case with a tension tie between the hub and pitch case.

FIGS. 11a–11d are simplified, diagramatic perspective, top and side views of the embodiment of FIG. 1 showing the basic blade orientations assumable by the flexure of the present invention. FIG. 11a shows the flexure in an unflexed condition. FIG. 11b shows the flexure when blade flapping occurs. FIG. 11c shows the flexure when the blade is deflected through a lead-lag angle. FIG. 11d shows the flexure when the blade pitch is changed.

The above illustrated embodiments are described with reference to the Figures wherein like elements are referenced by like numerals.

DETAILED DESCRIPTION OF THE PREFERRED EMBODIMENTS

Figure 7:
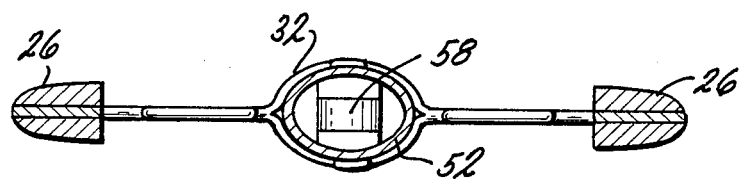
FIG. 7 is a cross sectional view taken through section 7—7 of FIG. 6.

A helicopter blade is coupled to a rotor hub by means of a planar flexure, which flexure lies in the rotor plane or parallel thereto. The flexure is particularly characterized by extending between the blade and rotor hub in the azimuthal direction in the rotor plane and by utilizing a bend as the flexing element. A bend is provided in the flexure in the coupling between the hub and blade.

FIG. 1 shows in top perspective view of one embodiment of the present invention wherein a blade 20 is coupled to a hub 22 by a planar, elastic means 24 as described below. In the embodiment of FIG. 1 hub 22 is characterized by having a plurality of hub arms 26. Each blade 20 is coupled through means 24 to a pair of hub arms 26. Blade 20 is provided with a rigid blade shank 28 extending from blade 20 between hub arms 26. In the unloaded and unflexed condition, blade shank arm 28 lies in a plane which is the same plane as or is generally parallel to the plane defined by hub arms 26 or the rotor plane defined by the rotation of blade 20.

Blade shank arm 28 is coupled to its adjacent hub arm 26 by a pair of elastic elements 30 and 32. In the embodiment of FIG. 1 elastic element 30 is disposed furtherst from the center of hub 22 while elastic element 32 is the closest element to the center of hub 22. In the illustrated embodiment, elements 30 and 32 are shown as integral pieces extending through shank arm 28. However, it is entirely within the scope of the present invention that elements 30 and 32 may be a composite of a number of component pieces. For example, elements 30 and 32 may each be comprised of a left and right flexure extending from the left and right hub arm 26 to shank arm 28 respectively.

As illustrated in FIG. 1 elements 30 and 32 each have a bend 34 disposed between shank arm 28 and the adjacent hub arm 26. Bend 34 defines a generally "U"-shaped flexure. The ends of the "U"-shaped flexure are coupled to blade 20 through shank arm 28 and hub 22 through hub arms 26. In the embodiment of FIG. 1 the closed end of the "U"-shaped flexure of bend 34 are disposed so as to be adjacent to each other. In the embodiment of FIG. 3, disposition of the closed "U"-shaped ends of bends 34 are oppositely directed so that the open ends of the "U"-shaped flexure are adjacent. In addition to the orientation of elements 30 and 32 as shown in FIGS. 1 and 3, it is also within the scope of the present invention that the elements could be disposed such that the "U"-shaped flexures have the same orientation. In this manner, the distance between the coupling of elements 30 and 32 to blade 20 or hub 22 can be varied according to design choice without change of the overall radial dimension of elements 30 and 32. Finally, blade 20 is controlled by push rod 36 as in conventional helicopters using bearingless couplings.

FIG. 2 is a cross section of the embodiment of FIG. 1 taken through section 2—2 and illustrates an advantage of the present invention. The thickness of elements 30 and 32 are comparable to or smaller than the thickness of hub arms 26 such that the cross section which elements 30 and 32 present to air flow 38 as the blade and hub system rotates is essentially controlled or determined by the aerodynamic cross section of hub arms 26. In other words, the amount of additional drag generated by means 24 is very low or practically negligible.

An alternative embodiment is shown in a top perspective view in FIG. 3. Hub 22 is coupled to blade 20 by means 24 which couples blade shank arms 40 with a hub arm 42. As previously stated, bends 34 of elements 30 and 32 are oppositely oriented with respect to each other relative as contrasted to the configuration illustrated in FIG. 1. However, in each case elements 30 and 32 generally lie in the same plane as or in a plane parallel to the rotor plane. In both embodiments blade 20 and hub 22 may further be coupled by a tensile, centrifugal force restraint 44 in the embodiment of FIG. 3 or restraint 46 in the embodiment of FIG. 1. Restraints 44 and 46 are flexible and provides only tensile reinforcement to secure blade 20 to hub 22. Restraints 44 and 46 do not substantially interfere with or inneract with the blade-to-hub coupling provided by elements 30 and 32.

A simplified perspective view of one embodiment of element 30 or 32 is shown in FIG. 4 wherein bends 34 are formed in wire or rod. Coupling means 24 is shown in the embodiment of FIG. 4 as a W-shaped, integral element having U-shaped bends 34 formed in the same plane. Ends 48 are coupled to hub 22 or blade 20 by such conventional means as may be appropriate. Center 50 of coupling means 24 is adapted to fit through blade shank 28 in the embodiment of FIG. 3. Coupling of center portion 50 of means 24 may also be accomplished by any other equivalent means in the art other than through fitting, including welding, clamping, through-bolting and the like.

FIG. 5 illustrates another embodiment of means 24 wherein elastic element 30 or 32 is formed from sheet or plate. High quality spring or tensile plate may be used to incorporate the desired elasticity and resiliency for each design application. Ends 48 and center portion 50 are adapted for through-bolting to hub 22 and blade 20 as appropriate. The design of FIGS. 4 and 5 illustrate the design flexibility of the present invention. The thickness or cross section of elements 30 or 32 may be arbitrarily varied at any point as well as the exact configuration of bend 34 to obtain a designed spring constant for each mode of flexure of means 24. In addition, means 24 may have an inherently varied spring constant at each point on element 30 or 32 by appropriate composition or processing of the material of elements 30 or 32, including a heterogeneous composite structure for elements 30 or 32. The exact geometric shaping or bends of elements 30 or 32 can be modified according to well understood design principles. Although only two "U"-shaped bends have been illustrated in each element, the number of bends may be increased as well as their specific configuration.

A third embodiment of the present invention is shown in plan view in FIG. 6 which is generally of the same type as shown in FIG. 1 except that a pitch case 52 is provided for coupling to blade 20 rather than a shank arm 28. Hub arms 26 are split as more readily shown in FIGS. 7–10 and are configured to bolt to the ends of elements 30 and 32 while center portions 50 of elements 30 and 32 are fed through mating holes provided through pitch case 42 and affixed thereto by welding, an adhesive elastomeric or other conventional means.

The hub end of pitch case 52 abuts an elastomeric lead-lag damper 54 which in turn abuts surface 56 of hub 22. Pitch case 52 is further secured to hub 22 by means of a tension tie 58 bolted to pitch case 52 and hub 22.

The relation of the various elements shown in plan view in FIG. 6 are more clearly illustrated in sectional views in FIGS. 7–10. For example, in FIG. 7 taken through section 7—7 of FIG. 6, the split arms of hub arms 26 are clearly illustrated together with the coupling of tension tie 58 to pitch case 52. As with conventional flexures, pitch case 52 is coupled to a pitch horn 36, best shown in FIGS. 6 and 9, for the purposes of pitch control.

Figure 8:
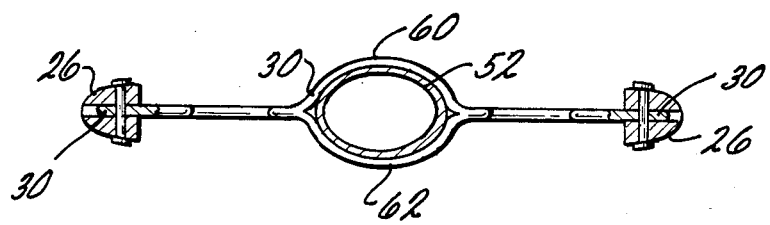
FIG. 8 is a cross sectional view taken through section 8—8 of FIG. 6.

FIG. 8 is a cross-sectional view through section 8—8 of FIG. 6 showing the coupling of element 30 to split hub arms 26 and to pitch case 52. In the embodiment of FIG. 6, element 30 is coupled to pitch case 52 by forming element 30 into an encircling harness having an upper strap 60 and lower strap 62 mating with pitch case 52. Straps 60 and 62 may be welded, bolted or simply fitted to pitch case 52 by virtue of an elongated cross section and tapering body shape of pitch case 52.

Figure 9:
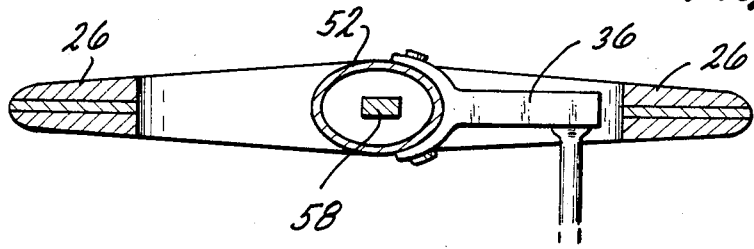
FIG. 9 is a cross sectional view taken through section 9—9 of FIG. 6.

FIG. 9 is a cross-sectional view taken through section 9—9 of FIG. 6 more clearly showing the attachment of pitch horn 36 to pitch case 52 and the extension of tension tie 58 through pitch case 52. As is discussed in greater detail in connection with FIGS. 11a– 11d, the present design leaves pitch case 52 relatively open to allow a wide choice of placement of pitch horn 36 on pitch case 52.

Figure 10:
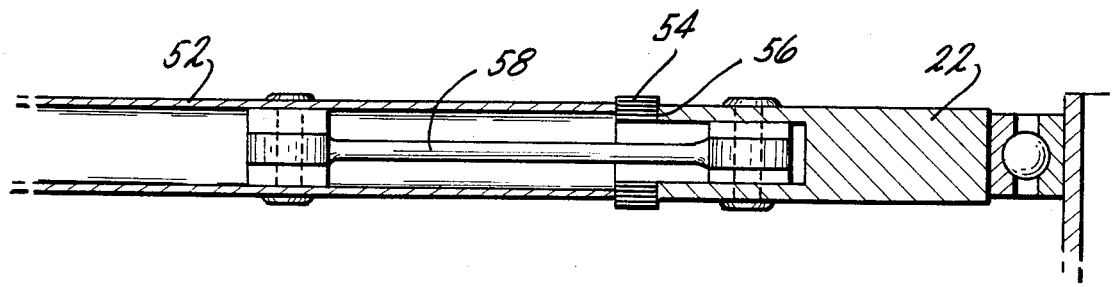
FIG. 10 is a cross sectional view taken through section 10—10 of FIG. 6.

Finally, FIG. 10 illustrates the cross-sectional view through section 10—10 of FIG. 6 showing the coupling of tension tie 58 at one end to pitch case 52 and at the opposing end to part of hub 22. The disposition of elastomeric dampener 54 between the end of pitch case 52 and hub 22 is also illustrated in cross section.

The operation of coupling means 24 of the present invention is shown in simplified, diagramatic view in FIGS. 11a–11d. FIG. 11a shows coupling means 24 in the embodiment of FIG. 1 wherein blade 20 and means 24, shown are underformed or unflexed.

FIG. 11b illustrates the situation wherein blade 20 is flapping in and out of the rotor plane. In this case coupling means 24 primarily bends torsionally about horizontal portions 64 to provide for the appropriate degree and direction of flexure.

FIG. 11c illustrates the case wherein blade 20 is rotated through a lead-lagged angle in the rotor plane. In that case, flexure is provided primarily through bends or angles 66 and to a lesser extent through the interconnecting straight portions of means 24. The angle between the virtual flapping "hinge" created by coupling means 24 and pitch horn 36 is defined as the angle, delta 3, best shown in FIGS. 6 and 11c. Since elements 30 and 32 couple to shank arm 28 only at four defined points, pitch horn 36 may be coupled thereto at virtually any position from the hub end of shank arm 28 to a point adjacent to the virtual flapping "hinge". The degree of pitch-to-flapping coupling common to most helicopter control systems, can thus be easily varied according to conventional design choice in a coupling of the present invention.

Finally, pitch of blade 20 is varied as shown in FIG. 11d principally by torsion of elements 68. Thus it can be readily appreciated by reviewing FIGS. 11a–11d that flexure for flapwise motion, lead-lag motion, and pitch variation is accomplished by bending or torsion of virtually every portion of the U-shaped flexure of coupling means 24.

However, it must be understood that many modifications and variations may be made by those having ordinary skill in the art without departing from the spirit and scope of the present invention as set forth in the following claims. For example, although a "U"-shaped flexure has been shown in the illustrated embodiment, it must be understood that any other flexure shape, consistent with the principles of the present invention, is included within its scope. What has been devised then is a simplified design for a bearingless coupling between a blade and rotor of a helicopter which is rugged, inexpensive to manufacture, which can be carefully controlled as to its properties and characteristics, and which provides a very low or negligible addition to the drag experienced by the rotor system.

I claim:

1. In a helicopter having a hub-to-blade, bearingless coupling, an improvement comprising:
    a rotary hub having a plurality of radially extending and generally planar hub arms;
    a blade having a blade shank proximate to said hub arms; and
    planar elastic means for coupling said blade shank to said hub arms, said means being disposed between a pair of said hub arms in a plane of flexure parallel to the plane defined by said hub arms, said planar elastic means characterized by longitudinal cross section transverse to said plane of said hub arms which cross section is substantially smaller than the longitudinal cross section of said hub arms, whereby a rugged, inexpensive, low drag, bearingless flexure is provided for hub-to-blade couplings in a helicopter,
    wherein said means comprises two pairs of elastic elements, each pair of elastic elements coupling said blade shank to an adjacent one of said pair of hub arms.

2. The improvement of claim 1 wherein each said elastic element is generally "U"-shaped, the extended ends of which are coupled respectively to said blade shank and said adjacent hub arm.

3. The improvement of claim 2 wherein said "U"-shaped elastic element is generally co-planar with said adjacent hub arms and has a smaller vertical thickness in said plane of flexure so that the vertical thickness of said hub arms is the controlling aerodynamic cross section relevant to the rotation of said blade and hub.

4. In a helicopter having a hub-to-blade, bearingless coupling, an improvement comprising:
    a rotary hub having a plurality of radially extending ahd generally planar hub arms;
    a blade having a blade shank proximate to said hub arms; and planar elastic means for coupling said blade shank to said hub arms, said means being disposed between a pair of said hub arms in a plane of flexure parallel to the plane defined by said hub arms, said planar elastic means characterized by longitudinal cross section transverse to said plane of said hub arms which cross section is substantially smaller than the longitudinal cross section of said hub arms, whereby a rugged, inexpensive, low drag, bearingless flexure is provided for hub-to-blade couplings in a helicopter, wherein said elastic means includes a wire having at least one flexing bend formed therein.

5. In a helicopter having a hub-to-blade, bearingless coupling, an improvement comprising:

a rotary hub having a plurality of radially extending and generally planar hub arms;

a blade having a blade shank proximate to said hub arms; and planar elastic means for coupling said blade shank to said hub arms, said means being disposed between a pair of said hub arms in a plane of flexure parallel to the plane defined by said hub arms, said planar elastic means characterized by longitudinal cross section transverse to said plane of said hub arms which cross section is substantially smaller than the longitudinal cross section of said hub arms, whereby a rugged, inexpensive, low drag, bearingless flexure is provided for hub-to-blade couplings in a helicopter, wherein said elastic means includes a plate having at least one flexing bend formed therein.

6. The improvement of claim 4 or 5 wherein said flexing bend lies in said plane of flexure.

7. In combination with a blade and a hub and in a helicopter hub-to-blade bearingless coupling between said blade and hub, said blade defining a rotor plane when said blade is rotated about said hub, an improvement comprising:

a planar elastic flexure for azimuthally coupling said blade to said hub, said planar flexure being disposed in a plane parallel to said rotor plane, and extending between said blade and hub in a generally azimuthal direction in said rotor plane, said planar elastic flexure characterized by a longitudinal cross section transverse to said plane of said rotor plane, which cross section is smaller than the longitudinal cross section of said blade, wherein said flexure includes at least a pair of elastic elements disposed between said blade and hub, each element extending in a generally azimuthal direction in said rotor plane, each said element having at least one flexing bend formed therein, whereby a rugged, inexpensive, low drag, bearingless coupling is provided between said blade and hub.

8. The improvement of claim 7 wherein said elastic element is a metallic rod.

9. The improvement of claim 7 wherein said elastic element is a flat metallic plate.

10. The improvement of claim 7 wherein each said element is "U"-shaped, the extended ends of which are coupled between said blade and hub, the axis of symmetry of said "U"-shaped element lying in a generally radial direction and in said rotor plane.

11. The improvement of claim 7 wherein said blade has opposing shank arms and wherein each said element is generally "W"-shaped, the extended ends of which are coupled between said opposing shank arms of said blade, the axis of symmetry of said "W"-shaped element lying in a generally radial direction, the center of said "W"-shaped element being coupled to said hub.

12. The improvement of claim 7 wherein said hub has a plurality of radially extending pairs of hub arms, and wherein each said element is generally "W"-shaped, the extended ends of which are coupled between said hub arms of one pair of said plurality of hub arms, the center of said "W"-shaped element being coupled to said blade.

13. In combination with a blade and a hub and in a helicopter-to-blade bearingless coupling between said blade and hub, said blade defining a rotor plane when said blade is rotated about said hub, an improvement comprising:

a planar elastic flexure for azimuthally coupling said blade to said hub, said planar flexure being disposed in a plane parallel to said rotor plane, and extending between said blade and hub in a generally azimuthal direction in said rotor plane, said planar elastic flexure characterized by a longitudinal cross section transverse to said plane of said rotor plane, which cross section is smaller than the longitudinal cross section of said blade, wherein said blade is coupled to said hub by a pair of said elastic flexures, each flexure having two flexing bends formed therein, one said flexing bend of each flexure being disposed between said blade and hub in a generally azimuthal direction in said rotor plane, whereby a rugged, inexpensive, low drag, bearingless coupling is provided between said blade and hub.

14. The improvement of claim 13 wherein said bend has an axis of symmetry, said axis of symmetry lying in a generally radial direction in said rotor plane.

15. The improvement of claim 14 wherein said bends of said pair of flexures have their axes of symmetry generally lying on the same axis.

16. The improvement of claim 15 wherein said bend is "U"-shaped with the closed end of said "U"-shaped bend of one flexure adjacent the closed end of said "U"-shaped bend of said other flexure of said pair of flexures.

17. The improvement of claim 15 wherein said bend is "U"-shaped with the open end of said "U"-shaped bend of one flexure adjacent the open end of said "U"-shaped bend of said other flexure of said pair of flexures.

* * * * *